(12) United States Patent
Ota et al.

(10) Patent No.: US 7,919,215 B2
(45) Date of Patent: Apr. 5, 2011

(54) CORROSION RESISTANT METAL OXIDE ELECTRODE CATALYST FOR OXYGEN REDUCTION

(75) Inventors: Kenichiro Ota, Tokyo (JP); Nobuyuki Kamiya, Kanagawa (JP); Shigenori Mitsushima, Kanagawa (JP); Akimitsu Ishihara, Kanagawa (JP); Liu Yan, Beijing (CN)

(73) Assignee: Japan Science and Technology Agency, Kawaguchi-shi (JP)

( * ) Notice: Subject to any disclaimer, the term of this patent is extended or adjusted under 35 U.S.C. 154(b) by 963 days.

(21) Appl. No.: 11/660,602

(22) PCT Filed: Aug. 18, 2005

(86) PCT No.: PCT/JP2005/015052
§ 371 (c)(1),
(2), (4) Date: Feb. 20, 2007

(87) PCT Pub. No.: WO2006/019128
PCT Pub. Date: Feb. 23, 2006

(65) Prior Publication Data
US 2007/0259267 A1 Nov. 8, 2007

(30) Foreign Application Priority Data

Aug. 19, 2004 (JP) .................................. 2004-239589
Mar. 29, 2005 (JP) .................................. 2005-093651

(51) Int. Cl.
*H01M 4/02* (2006.01)
(52) U.S. Cl. ........ 429/523; 429/528; 429/532; 429/500; 427/115
(58) Field of Classification Search .................... 429/40, 429/41, 44, 33, 46; 502/100, 102, 103, 300, 502/308, 317, 311; 427/115
See application file for complete search history.

(56) References Cited

U.S. PATENT DOCUMENTS

| 6,297,180 B1 * | 10/2001 | Maier .............................. 501/12 |
| 2004/0058808 A1 | 3/2004 | Lu et al. |
| 2004/0115515 A1 * | 6/2004 | Ueda et al. ...................... 429/40 |

FOREIGN PATENT DOCUMENTS

| JP | 47-8341 B1 | 3/1972 |
| JP | 3-252057 A | 11/1991 |
| JP | 6-235083 A | 8/1994 |
| JP | 7-3497 A | 1/1995 |
| JP | 7-289903 A | 11/1995 |
| JP | 9-167620 A | 6/1997 |
| JP | 2001-522122 A | 11/2001 |
| JP | 2003-200051 A | 7/2003 |
| JP | 2004-95263 A | 3/2004 |
| JP | 2004-197130 A | 7/2004 |
| JP | 2004-303664 A | 10/2004 |
| JP | 2005-63677 A | 3/2005 |
| JP | 2005-161203 A | 6/2005 |
| WO | WO 99/16546 A1 | 4/1999 |

OTHER PUBLICATIONS

T. Horibe et al.; "Oxygen reduction reaction on Platinum Tungsten Oxide electrode", The Electrochemical Society of Japan, p. 90, 3C11, Mar. 25, 2002. Cited in the ISR.
H. Kohler et al.; "Catalysis of the Oxygen Reduction of $W_{18}O_{49}$ Electrodes by OH Induced Surface States", J. Electrochem. Soc., vol. 139, No. 11, pp. 3035-3042, Nov. 1992. Cited in the ISR.
J. Shim et al.; "Electrochemical characteristics of $Pt-WO_3/C$ and $Pt-TiO_2/C$ electrocatalysts in a polymer electrolyte fuel cell"; Journal of Power Sources, vol. 102, pp. 172-177. 2001.
A. Katayama "Electrooxidation of Methanol on a Platinum-Tin Oxide Catalyst", J. Phys. Chem. vol. 84, pp. 376-381, 1980.
International Search Report of PCT/JP2005/015052, date of mailing: Nov. 22, 2005.
Translation of International Preliminary Report on Patentability mailed Mar. 29, 2007 of International Application No. PCT/JP2005/015052.

* cited by examiner

*Primary Examiner* — Raymond Alejandro
(74) *Attorney, Agent, or Firm* — Westerman, Hattori, Daniels & Adrian, LLP

(57) ABSTRACT

A corrosion-resistant electrode catalyst for oxygen reduction includes a main catalyst composed of at least one transition metal oxide selected from oxygen-deficient $ZrO_2$, $Ta_2O_5$, $Nb_2O_5$, $TiO_2$, $V_2O_5$, $MoO_3$, and $WO_3$ and a co-catalyst composed of gold. The electrode catalyst is used in contact with an acidic electrolyte at a potential at least 0.4 V higher than the reversible hydrogen electrode potential. The catalyst may be used, for example, in such a form that the transition metal oxide in the form of fine particles and gold in the form of fine particles, or fine particles including fine gold particles coated with the transition metal oxide are dispersed on a catalyst carrier which is an electron conductive powder. This electrode catalyst is suitable as an electrode catalyst for an electrochemical system using an acidic electrolyte in the fields of water electrolysis, inorganic/organic electrolysis, fuel cells, etc.

6 Claims, 4 Drawing Sheets

CORROSION RESISTANT METAL OXIDE ELECTRODE CATALYST FOR OXYGEN REDUCTION

BACKGROUND OF THE INVENTION

1. Technical Field

The present invention relates to electrode catalysts for oxygen reduction for electrochemical systems which use acidic electrolytes in the fields of water electrolysis, inorganic/organic electrolysis, fuel cells, etc. More particularly, the invention relates to an electrode catalyst for oxygen gas diffusion electrodes, namely, oxygen electrode of fuel cells which use solid polymer electrolyte membranes. An oxygen electrode means a cathode.

2. Description of Related Art

Noble metals, in particular, platinum, are stable over a wide potential range and have high catalytic activity for various reactions, and thus are used as electrode catalysts for various electrochemical systems.

Some metal oxides are stable in acidic electrolytes over a wide potential range. Therefore, research has been conducted on enhancing the catalytic activity of platinum by allowing metal oxides to coexist with platinum (for example, Non-patent Documents 1 and 2, and Patent Document 1). However, the catalytic activity of metal oxides themselves has not been evaluated in detail.

With respect to catalysts having high oxygen reduction activity, other than noble metals, use of spinel-type and perovskite-type oxides (Patent Document 2) and double oxides, such as oxides having a columbite structure, an ilmenite structure, an olivine structure, a NASICON structure, and the like as catalysts for fuel cells, air cells, oxygen sensors, etc. (Patent Document 3) has been known. Furthermore, an electrode catalyst in which rare-earth oxide fine particles are mixed as a promoter with noble metal catalyst fine particles and which is suitable for use in gas diffusion electrodes for brine electrolysis and the like (Patent Document 4) has also been known.

Furthermore, in an apparatus in which an ozone generator for supplying an ozone-containing gas is installed upstream of a fuel cell that uses a solid polymer electrolyte membrane, a method has been known in which as a catalyst suitable for reduction reaction of ozone, a metal oxide selected from $WO_3$, $TiO_2$, $ZrO_2$, PtO, $Sb_2O_4$, and $Sb_2O_3$ is used as an electrode catalyst (Patent Document 5). In addition, as oxide-based electrode catalysts, use of $TiO_2$, $Ta_2O_5$, and the like has been known (Patent Documents 6 to 10).

Patent Document 1: Japanese Unexamined Patent Application Publication No. 9-167620
Patent Document 2: Japanese Unexamined Patent Application Publication No. 7-289903
Patent Document 3: Japanese Unexamined Patent Application Publication No. 2003-200051
Patent Document 4: Japanese Unexamined Patent Application Publication No. 2004-197130
Patent Document 5: Japanese Unexamined Patent Application Publication No. 2004-95263
Patent Document 6: Japanese Unexamined Patent Application Publication No. 3-252057
Patent Document 7: Japanese Patent No. 3149629
Patent Document 8: United States Patent Application No. 2004/0058808
Patent Document 9: PCT Japanese Translation Patent Publication No. 2001-522122
Patent Document 10: Japanese Unexamined Patent Application Publication No. 2005-63677
Non-patent Document 1: J. Shim et al., J. Power Sources, 102, 172 (2001)
Non-patent Document 2: A. Katayama, J. Phys. Chem., 84, 376 (1980)

SUMMARY OF INVENTION

Alternative materials to platinum catalysts have been desired because of the high cost and limited reserves of platinum and because electrode catalysts having higher activity are required for fuel cells and the like. In general, many oxides dissolve in acidic electrolytes. Furthermore, it has been reported that carbides and many other non-platinum-based compounds are activated and dissolved and cannot be stably present under conditions of an electrode potential as high as 0.4 V or above (Hiroshi Yoneyama et al., *Denkikagaku*, 41, 719 (1973)).

Although double oxides, such as perovskite, are known as electrode catalysts, double oxides are not suitable for use as electrode catalysts for oxygen reduction, namely, cathode catalyst for electrochemical systems which use acidic electrolytes. Furthermore, as described in Patent Document 5, an oxide, such as $WO_3$, is used for reduction of ozone. However, a Pt catalyst is combined with the oxide for reduction of oxygen.

There is hardly any alternative to noble metals as catalysts in electrochemical systems, such as solid polymer fuel cells, phosphoric-acid fuel cells, sulfuric-acid fuel cells, and water electrolysis cells, which use acidic electrolytes, such as phosphoric acid, sulfuric acid, and proton-conduction polymer membranes. Consequently, it has been difficult to search for cathode catalysts for oxygen reduction that maintain catalytic activity and are stable over a wide potential range in an acidic electrolyte.

The present invention provides an electrode catalyst for oxygen reduction including at least one transition metal oxide selected from oxygen-deficient $ZrO_2$, $Ta_2O_5$, $Nb_2O_5$, $SnO_2$, $TiO_2$, $V_2O_5$, and $MoO_3$. The present inventors have found that, depending on the mode of use, these metal oxides can exhibit corrosion resistance such that they are not dissolved even if used at a potential higher than 0 V relative to the reversible hydrogen electrode potential in an acidic electrolyte, and that, in particular, if gold is used as a promoter, the oxygen reduction activity of the electrode further improves and the metal oxides can be used as electrode catalysts that are used in contact with an acidic electrolyte at a potential at least 0.4 V higher than the reversible hydrogen electrode potential.

That is, according to the present invention, (1) a corrosion-resistant electrode catalyst for oxygen reduction is characterized by including a main catalyst composed of at least one transition metal oxide selected from oxygen-deficient $ZrO_2$, $Ta_2O_5$, $Nb_2O_5$, $SnO_2$, $TiO_2$, $V_2O_5$, and $MoO_3$ and a promoter composed of gold, the electrode catalyst being used in contact with an acidic electrolyte at a potential at least 0.4 V higher than the reversible hydrogen electrode potential.

Furthermore, (2) in the corrosion-resistant electrode catalyst for oxygen reduction of the present invention according to item (1), the transition metal oxide in the form of fine particles and gold in the form of fine particles are dispersed on a catalyst carrier which is an electron conductive powder.

Furthermore, (3) in the corrosion-resistant electrode catalyst for oxygen reduction of the present invention according to item (1), fine particles including fine gold particles coated with the transition metal oxide are dispersed on a catalyst carrier which is an electron conductive powder.

Furthermore, (4) in the corrosion-resistant electrode catalyst for oxygen reduction of the present invention according to any one of items (1) to (3), the electrode catalyst is used as an oxygen electrode catalyst of a fuel cell which uses an acidic electrolyte, such as a solid polymer membrane, phosphoric acid, or sulfuric acid.

The present inventors have found that since adsorption bond energy between transition metal atoms and oxygen atoms is high in at least one transition metal oxide selected from oxygen-deficient $ZrO_2$, $Ta_2O_5$, $Nb_2O_5$, $SnO_2$, $TiO_2$, $V_2O_5$, and $MoO_3$ depending on the mode of use, these metal oxides are not eroded in an acidic electrolyte over a wide potential range and are stable, that by forming the electrode such that the surface thereof is covered with the metal oxides, the catalyst itself can be present stably, and that the metal oxides have catalytic activity for oxygen reduction in which oxygen in oxygen ($O_2$) gas used as an oxidizing agent is received due to oxygen deficiency and oxygen is allowed to react with protons in the electrolyte.

However, use of the transition metal oxide alone does not make it possible to obtain a sufficiently high potential relative to the reversible hydrogen electrode potential in contact with an acidic electrolyte. The present inventors have found that by allowing gold, as a promoter, to coexist with the main catalyst composed of such a transition metal oxide, the electrode catalyst can be used in contact with an acidic electrolyte at a potential at least 0.4 V higher than the reversible hydrogen electrode potential, and the oxygen reduction activity of the electrode can be further improved.

A corrosion-resistant electrode catalyst for oxygen reduction according to the present invention has high corrosion resistance in contact with an acidic electrolyte over a wide potential range and also has catalytic activity for oxygen reduction.

DETAILED DESCRIPTION

An electrode catalyst of the present invention includes a main catalyst composed of at least one transition metal oxide selected from oxygen-deficient $ZrO_2$, $Ta_2O_5$, $Nb_2O_5$, $SnO_2$, $TiO_2$, $V_2O_5$, and $MoO_3$. In these metal oxides, adsorption bond energy between metal atoms and oxygen atoms is high. An adsorption bond energy of 550 kJ/mol or higher is required in order that a oxygen electrode catalyst for a solid polymer fuel cell is stable in an acidic electrolyte. Each of Fe, Co, and Ni has an adsorption bond energy on the order of 400 to 500 kJ/mol, which is lower than those of Zr and V, and actually, is actively dissolved in an acidic electrolyte, thus being unstable. Furthermore, noble metal oxides have low adsorption bond energy and are unstable.

Depending on the mode of use, at least one transition metal oxide selected from oxygen-deficient $ZrO_2$, $Ta_2O_5$, $Nb_2O_5$, $SnO_2$, $TiO_2$, $V_2O_5$, and $MoO_3$ can be used in an acidic electrolyte at a potential higher than 0 V relative to the reversible hydrogen electrode potential. At 0 V or lower, hydrogen generation proceeds and the oxide may be reduced, which makes it impossible to use the oxide as an electrode catalyst.

Figure 1:
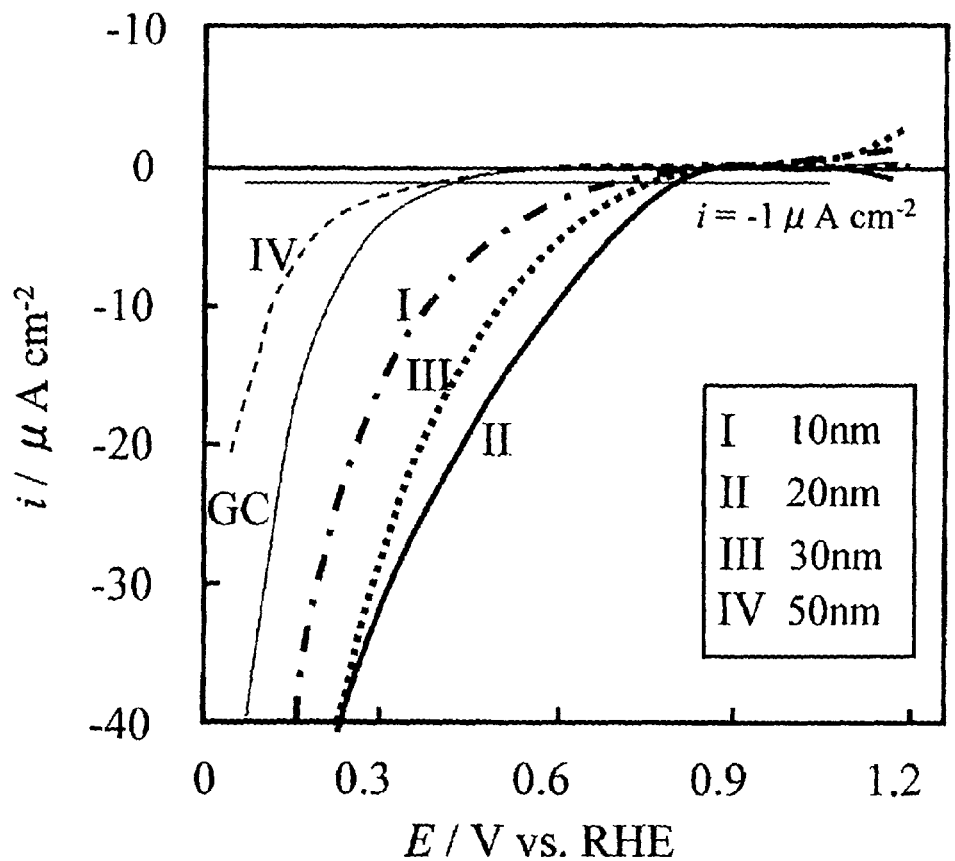
FIG. 1 is a graph showing current-potential curves measured at a potential-scanning rate of 1 mV/s in an oxygen reduction reaction when $ZrO_{2-x}$ layers, as a transition metal oxide, with various thicknesses were formed by sputtering on the surface of glassy carbon.
Figure 2:
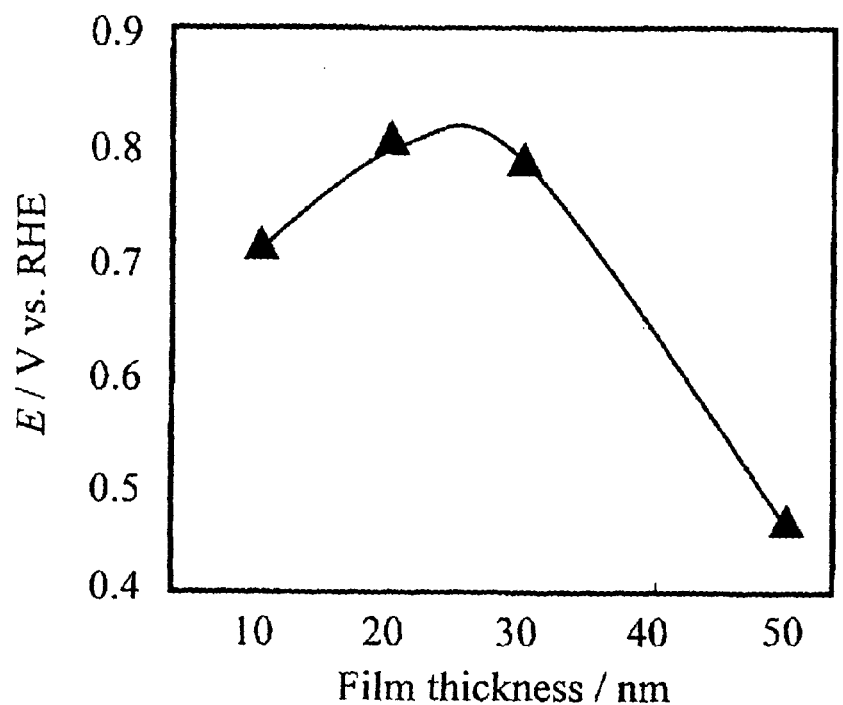
FIG. 2 is a graph showing the dependency of the electrode potential at $-1$ $\mu Acm^{-2}$ on the thickness of $ZrO_{2-x}$ layers measured at a potential-scanning rate of 1 mV/s.

FIG. 1 shows current-potential curves measured at a potential-scanning rate of 1 mV/s in an oxygen reduction reaction when $ZrO_{2-x}$ layers, as a transition metal oxide, with various thicknesses were formed by sputtering on the surface of glassy carbon. FIG. 2 shows the dependency of the electrode potential at $-1$ $\mu Acm^{-2}$ on the thickness of $ZrO_{2-x}$ layers measured at a potential-scanning rate of 1 mV/s.

As is evident from FIGS. 1 and 2, in view of the level of electrode potential, the thickness of the $ZrO_{2-x}$ layer is preferably in a range of about 20 (indicated by II in FIG. 1) to 30 nm (indicated by III in FIG. 1). The reason for this is believed to be that as the thickness changes, the compositional ratio between the transition metal and oxygen at the surface changes, and at a thickness of 20 to 30 nm, the catalytic activity becomes high. If the thickness is excessively large, such as 50 nm (indicated by IV in FIG. 1), the resistance increases and the current decreases.

Consequently, in order that the electrode catalyst can be used in contact with an acidic electrolyte at a potential at least 0.4 V higher than the reversible hydrogen electrode potential, it is important to adjust the thickness, which is the mode of use of the transition metal oxide. Furthermore, in order that catalytic activity can be obtained without impairing stability in an acidic electrolyte, preferably, the oxygen deficiency is in the following compositional ranges: $ZrO_{x1}$ (0.25<x1<2.0), $TaO_{x2}$ (0.15<x2<2.5), $NbO_x3$ (0.15<x3<2.5), $TiO_x4$ (0.25<x4<2.0), $VO_{x5}$ (0.15<x5<2.5), and $MoO_{x6}$ (0.75<x6<3.0).

When gold, as a promoter, is allowed to coexist with the main catalyst composed of the transition metal oxide, the oxygen reduction activity of the electrode is further improved. By allowing gold to coexist with the transition metal oxide, transfer of electrons occurs between the transition metal oxide and gold. As a result, the electronic state of the transition metal oxide changes and the catalytic activity improves.

The transition metal oxide and gold are allowed to coexist in any manner such that transfer of electrons therebetween is possible. For example, the transition metal oxide and gold may be in the form of an alloy or a solid solution. Alternatively, a structure may be used in which an electrode base is coated with a gold layer and the gold layer is further coated with a transition metal oxide layer. A mixture of fine particles may be used as long as electrical contact is sufficiently ensured.

Furthermore, since gold itself does not participate in reaction, a powder catalyst may be used in which fine gold particles with a diameter in the range of about 2 nm to about 30 nm are used as nuclei, and the fine gold particles are coated with the transition metal oxide. In such a case, fine gold particles are prepared in advance by a colloid method or the like. The previously prepared fine gold particles are dispersed in a solution containing metal ions constituting the oxide, and by adjusting pH, the metal is precipitated as a hydroxide around the fine gold particles. The hydroxide is subjected to dehydration/condensation using moderate heat treatment or the like, and thereby, a powder catalyst in which the fine gold particles are coated with the oxide is obtained.

The metal oxide and gold for the electrode catalyst for oxygen reduction of the present invention can be used by dispersing fine particles of each of the metal oxide and gold, or fine particles including fine gold particles coated with the transition metal oxide, in an amount of about 60% to 95% by weight, on a catalyst carrier which is an electron conductive powder composed of carbon or a conductive oxide, such as tungsten oxide or iridium oxide.

In order to produce the metal oxide used for the electrode catalyst for oxygen reduction, a method may be employed in which a metal salt or a metal complex is used as a starting material compound, and such a compound alone or in combination is dissolved in an organic solvent, such as an alcohol, and heat treatment is performed at about 923 K in air for about 2 hours. Thereby, fine particles with a primary particle size of about several nanometers to several hundred nanometers are produced, and secondary particles with a size of several micrometers in which the primary particles are aggregated are formed.

When a powder is used as the starting metal compound, the size of the resulting metal oxide fine particles is substantially determined according to the size of the starting material powder. Consequently, by adjusting the size of the starting material powder, it is possible to obtain fine particles with a desired size, for example, a primary particle size of 20 to 30 nm.

In order to form an electrode catalyst, dispersion on an electron conductive powder is preferred. Thus, preferably, fine particles with a particle size of 20 to 30 nm are dispersed on carbon, such as carbon black. For that purpose, a method in which the oxide catalyst is mechanically mixed with carbon, a method in which carbon powder is mixed in advance with a solution for forming the oxide catalyst, or the like may be employed.

In order to form the metal oxide layer on the gold layer, a method may be used in which a gold layer is formed by sputtering on a base, such as glassy carbon, in advance, and then sputtering is performed in an inert atmosphere, such as an argon atmosphere, using a transition metal oxide as a target, or reactive sputtering is performed in an oxygen atmosphere with an oxygen partial pressure of about 0.01 to 0.5 Pa, using a transition metal as a target.

Figure 3:
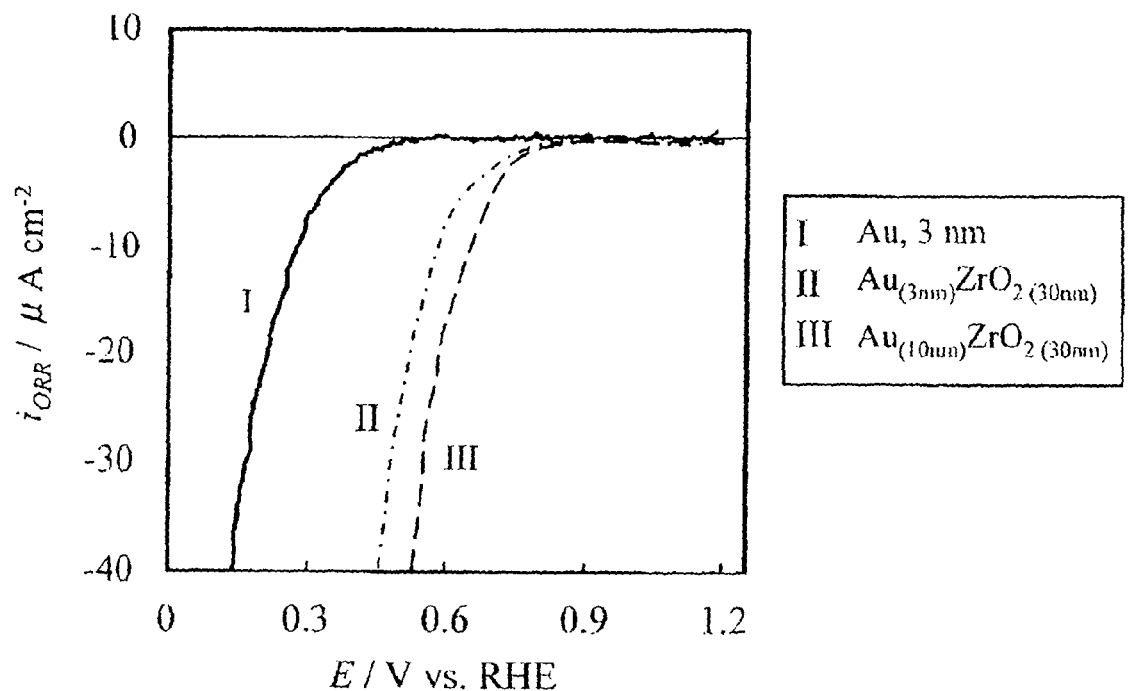
FIG. 3 is a graph showing current-potential curves measured at a potential-scanning rate of 5 mV/s in an oxygen reduction reaction when a $ZrO_2$ layer was formed by sputtering with a thickness of 30 nm.

FIG. 3 shows current-potential curves measured at a potential-scanning rate of 5 mV/s in an oxygen reduction reaction when a $ZrO_2$ layer, as a transition metal oxide layer, was formed by sputtering with a thickness of 30 nm. In this case, an increase in the catalytic activity is observed when the thickness of the gold layer formed on the surface of glassy carbon is about 3 nm (indicated by I in FIG. 3), and as the thickness of the gold layer increases, the catalytic activity increases. A thickness of the gold layer of about 10 nm (indicated by III in FIG. 3) is sufficient.

When the metal oxide is used for a fuel cell using carbon powder, such as carbon black, as a catalyst carrier which is an electron conductive powder that is chemically and electrochemically stable in the operating environment, by dispersing metal oxide fine particles and fine gold particles with a diameter of about 20 to 30 nm in the carbon, the amount of catalyst can be decreased.

Electrode catalysts for oxygen reduction according to the present invention can be used as electrode catalysts for oxygen reduction for electrochemical systems which use acidic electrolytes in the fields of water electrolysis, inorganic/organic electrolysis, fuel cells, etc., and in particular, can be used for acidic electrolyte-type fuel cells, such as phosphoric-acid fuel cells and polymer electrolyte fuel cells, which use electrode catalysts for oxidizing agent electrodes, namely oxygen electrode.

EXAMPLE 1

Using a glassy carbon cylinder with a diameter of 5.2 mm as a base, a gold layer of 10 nm was first formed on a bottom face thereof by a double sputtering technique. Then, a metal oxide electrode catalyst layer was formed by sputtering, the metal oxide including zirconium as the transition metal. An Au—$ZrO_{2-x}$ electrode catalyst was thereby produced. The helium pressure during sputtering was set at $1 \times 10^{-3}$ Pa or less. Au and stoichiometric zirconium oxide were used as sputtering targets.

Using a quartz oscillation-type film thickness meter, the amount of sputtering was measured. A zirconia oxide electrode with a zirconia oxide film thickness of about 30 nm was formed. The atomic compositional ratios between zirconium and oxygen at the surface and in the interior were identified by XPS. The results thereof are shown in Table 1 below.

TABLE 1

| Element | Surface | | Interior | |
|---|---|---|---|---|
| | O | Zr | O | Zr |
| Compositional ratio (%) | 67.9 | 32.1 | 62.1 | 37.9 |

The atomic compositional ratios between Zr and O calculated from Table 1 were $ZrO_{1.6}$ in the interior and $ZrO_{2.1}$ at the surface. The interior composition corresponds to the composition during film formation by sputtering. The surface composition corresponds to the composition after electrochemical measurement, in which oxidation proceeds compared with the interior composition. Zr in the composition during film formation is in a less oxidized state, i.e., in a more oxygen-deficient state, than $ZrO_2$.

Figure 4:
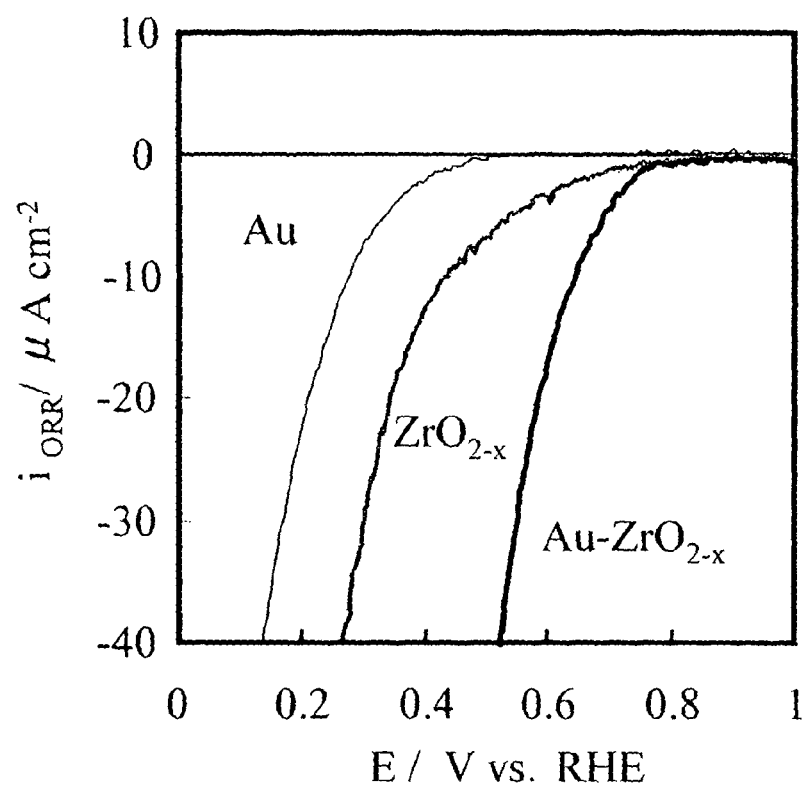
FIG. 4 is a graph evaluating the catalytic activity of an Au—$ZrO_{2-x}$ electrode catalyst in an oxygen reduction reaction in Example 1.

The catalytic activity of the resulting Au—$ZrO_{2-x}$ electrode was evaluated in relation to an oxygen reduction reaction. The resulting electrode was polarized in a 0.1 mol/dm³ sulfuric acid solution at a reaction temperature of 30° C., at a potential under a nitrogen atmosphere and an oxygen atmosphere in the range of 0.05 to 1.2 V, at a potential-scanning rate of 1 mV/s, and evaluation was performed on the basis of current-potential curves. As a reference electrode, a reversible hydrogen electrode was used in a sulfuric acid solution with the same concentration. The current density was expressed in terms of geometric area. FIG. 4 shows the current-potential curve of the resulting Au—$ZrO_{2-x}$ electrode in comparison with an Au only electrode and a $ZrO_2$-x electrode.

Under the oxygen atmosphere, the Au only electrode had low oxygen reduction activity and a reduction current was observed at about 0.5 V in the 0.1 mol/dm³ sulfuric acid solution. In the $ZrO_{2-x}$ electrode, a reduction current flowed at about 0.9 V or higher. In comparison with the $ZrO_{2-x}$ electrode, in the Au—$ZrO_{2-x}$ electrode, a large reduction current was observed at 0.75 V or higher. It is evident that the oxygen reduction activity of the $ZrO_{2-x}$ electrode was improved by the Au layer.

EXAMPLE 2

Figure 5:
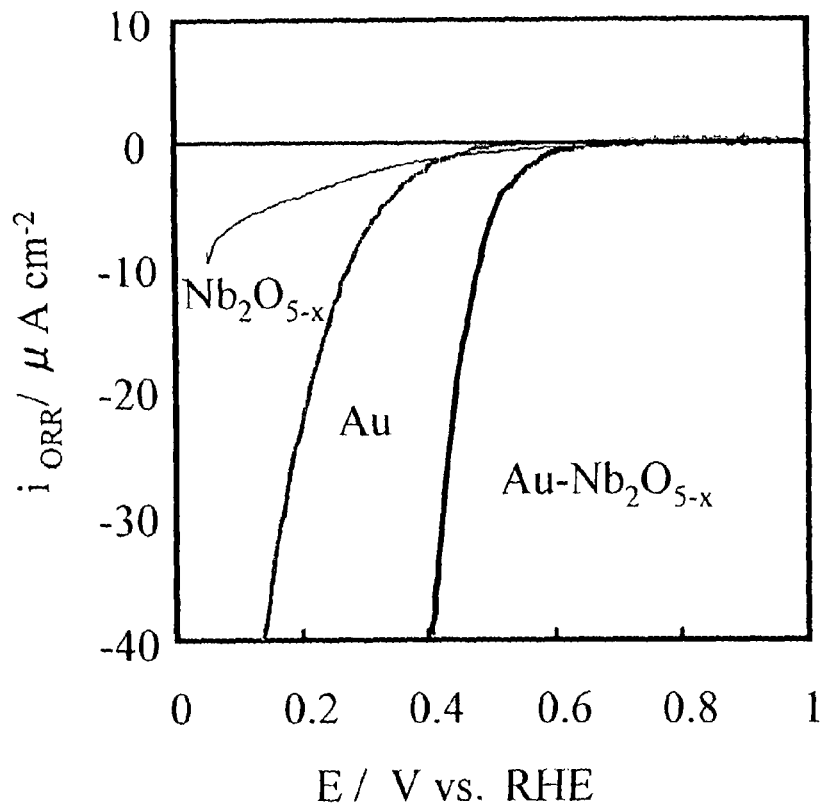
FIG. 5 is a graph evaluating the catalytic activity of an Au—$NbO_{5-x}$ electrode catalyst in an oxygen reduction reaction in Example 2.

An Au—NbO$_{5-x}$ electrode catalyst was produced under the same conditions as in Example 1 except that niobium was used as the transition metal. The catalytic activity of the resulting Au—NbO$_{5-x}$ electrode was evaluated in relation to an oxygen reduction reaction under the same conditions as in Example 1. FIG. 5 shows the current-potential curve of the resulting Au—NbO$_{5-x}$ electrode in comparison with an Au only electrode and a NbO$_{5-x}$ electrode. It is evident that the oxygen reduction activity of the NbO$_{5-x}$ electrode was improved by the Au layer.

EXAMPLE 3

Figure 6:
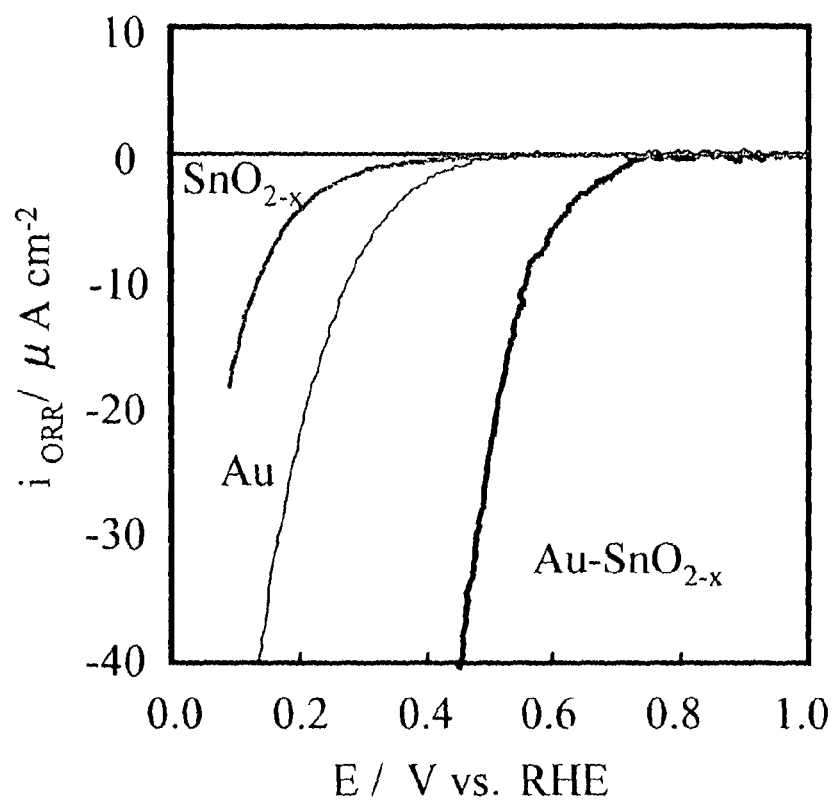
FIG. 6 is a graph evaluating the catalytic activity of an Au—$SnO_{2-x}$ electrode catalyst in an oxygen reduction reaction in Example 3.

An Au—SnO$_{2-x}$ electrode catalyst was produced under the same conditions as in Example 1 except that tin was used as the transition metal. The catalytic activity of the resulting Au—SnO$_{2-x}$ electrode was evaluated in relation to an oxygen reduction reaction under the same conditions as in Example 1. FIG. 6 shows the current-potential curve of the resulting Au—SnO$_{2-x}$ electrode in comparison with an Au only electrode and a SnO$_{2-x}$ electrode. It is evident that the oxygen reduction activity of the SnO$_{2-x}$ electrode was improved by the Au layer.

EXAMPLE 4

Figure 7:
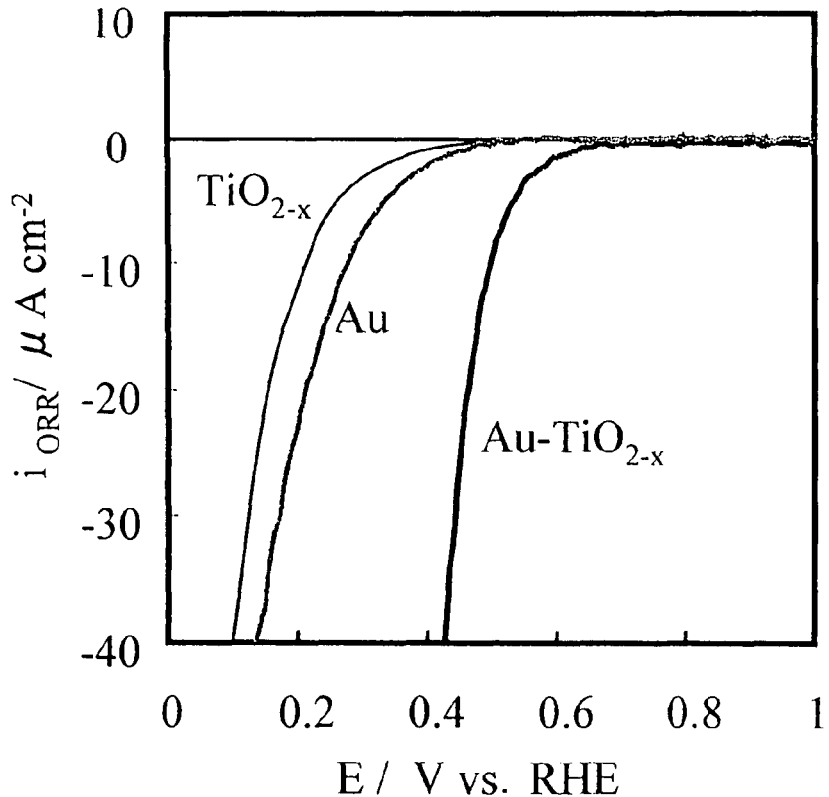
FIG. 7 is a graph evaluating the catalytic activity of an Au—$TiO_{2-x}$ electrode catalyst in an oxygen reduction reaction in Example 4.

An Au—TiO$_2$-x electrode catalyst was produced under the same conditions as in Example 1 except that titanium was used as the transition metal. The catalytic activity of the resulting Au—TiO$_{2-x}$ electrode was evaluated in relation to an oxygen reduction reaction under the same conditions as in Example 1. FIG. 7 shows the current-potential curve of the resulting Au—TiO$_2$-x electrode in comparison with an Au only electrode and a TiO$_{2-x}$ electrode. It is evident that the oxygen reduction activity of the TiO$_{2-x}$ electrode was improved by the Au layer.

EXAMPLE 5

Figure 8:
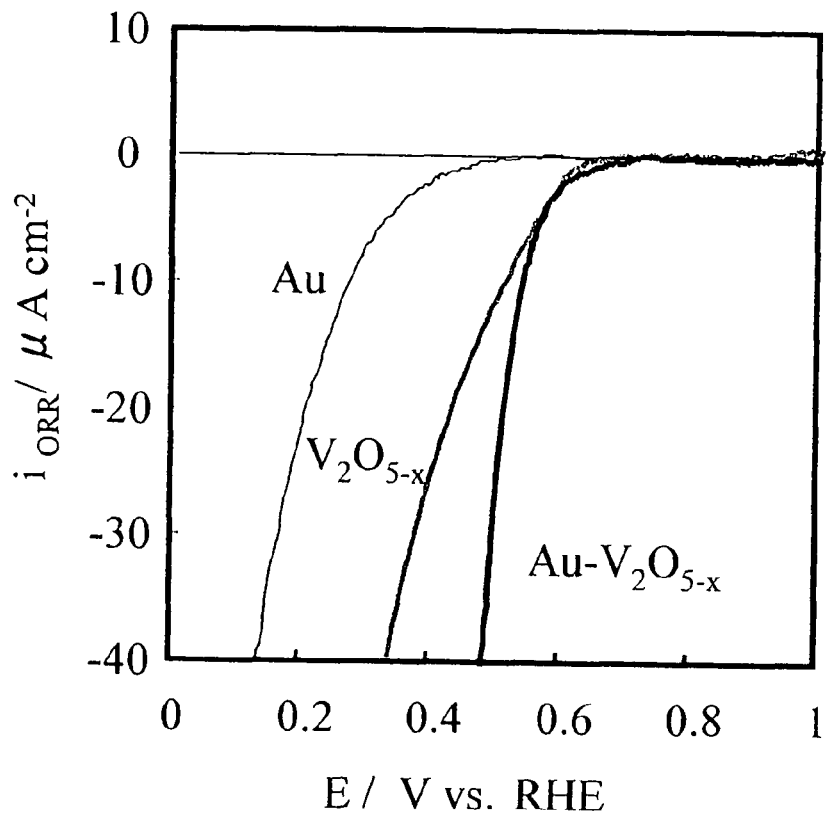
FIG. 8 is a graph evaluating the catalytic activity of an Au—$VO_{5-x}$ electrode catalyst in an oxygen reduction reaction in Example 5.

An Au—VO$_{5-x}$ electrode catalyst was produced under the same conditions as in Example 1 except that vanadium was used as the transition metal. The catalytic activity of the resulting Au—VO$_{5-x}$ electrode was evaluated in relation to an oxygen reduction reaction under the same conditions as in Example 1. FIG. 8 shows the current-potential curve of the resulting Au—VO$_{5-x}$ electrode in comparison with an Au only electrode and a VO$_{5-x}$ electrode. It is evident that the oxygen reduction activity of the VO$_{5-x}$ electrode was improved by the Au layer.

INDUSTRIAL APPLICABILITY

Electrode catalysts for oxygen reduction according to the present invention are useful as electrode catalysts for electrochemical systems used in contact with acidic electrolytes in the fields of water electrolysis, inorganic/organic electrolysis, fuel cells, etc.

The invention claimed is:

1. A corrosion-resistant oxygen electrode for fuel cell, which uses an acidic electrolyte, comprising:
    an electrode substrate;
    a gold layer as a promoter formed on the electrode substrate; and
    a transition metal oxide layer as a catalyst formed on the gold layer, the transition metal oxide layer comprising at least one transition metal oxide selected from Ta$_2$O$_5$, Nb$_2$O$_5$, SnO$_2$, TiO$_2$, V$_2$O$_5$, and ZrO$_{x1}$ wherein the value of X1 satisfies 0.25<X1<2.0 at a thickness of 20 to 30 nm,
    wherein the transition metal oxide layer is in a oxygen-deficient state, and wherein the oxygen electrode is configured as a part of the fuel cell comprising the acidic electrolyte and a fuel electrode.

2. The corrosion-resistant oxygen electrode according to claim 1, wherein the transition metal oxide layer comprises oxygen-deficient Ta$_2$O$_5$.

3. The corrosion-resistant oxygen electrode according to claim 1, wherein the transition metal oxide layer comprises oxygen-deficient Nb$_2$O$_5$.

4. The corrosion-resistant oxygen electrode according to claim 1, wherein the transition metal oxide layer comprises oxygen-deficient SnO$_2$.

5. The corrosion-resistant oxygen electrode according to claim 1, wherein the transition metal oxide layer comprises oxygen-deficient TiO$_2$.

6. The corrosion-resistant oxygen electrode according to claim 1, wherein the transition metal oxide layer comprises oxygen-deficient V$_2$O$_5$.

* * * * *